UNITED STATES PATENT OFFICE.

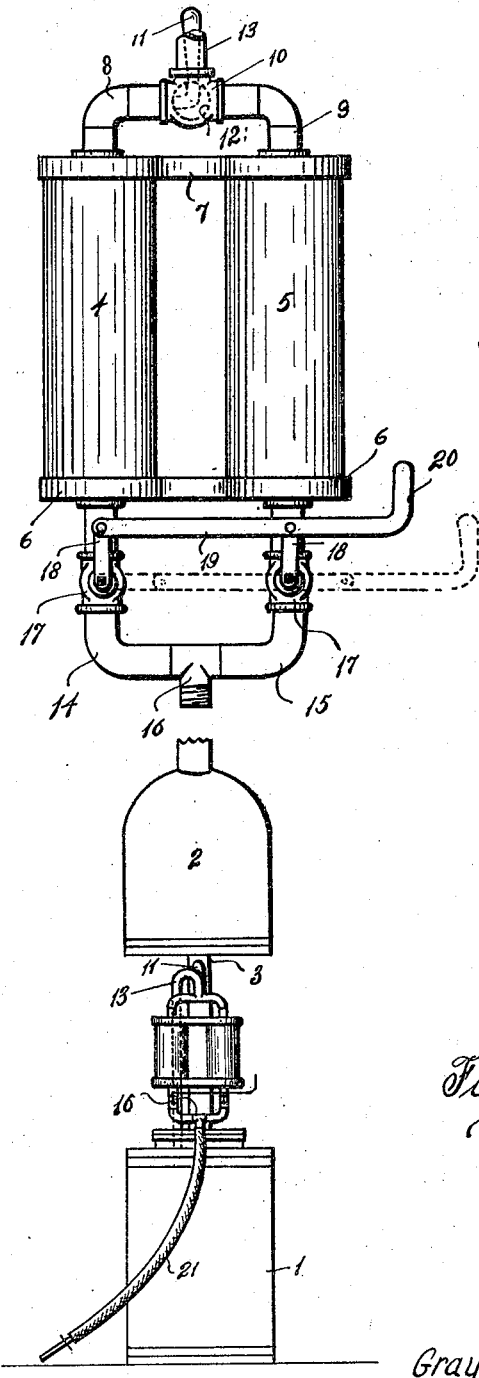

GRAYDON M. TERRY, OF DALLAS, TEXAS.

SIGHT-FEED MEASURING DEVICE.

1,276,448.  Specification of Letters Patent.  Patented Aug. 20, 1918.

Application filed December 11, 1916. Serial No. 136,355.

*To all whom it may concern:*

Be it known that I, GRAYDON M. TERRY, a citizen of the United States of America, residing at Dallas, in the county of Dallas, State of Texas, have invented certain new and useful Improvements in Sight-Feed Measuring Devices, of which the following is a specification.

This invention relates to a new and useful sight feed or visible liquid measuring device adaptable for use in connection with fuel oil dispensing stations such as gasolene filling stations, and is especially adapted and designed for adaptation to and in connection with the present day automatic measuring fuel dispenser such as is used by the various gasolene and fuel oil concerns which dispense their fuel to automobile consumers.

A purpose of the invention is to provide a measuring device which will be in sight of and visible to the purchaser of gasolene or fuel as he sits in his car and while the vender operates the filling device, and is calculated to be such a measuring sight feed device as will put the buyer of fuel oil upon notice as to just what shortage, if any, or what quantity of fuel oil the seller is storing in the buyer's tank.

A further purpose of the invention is to provide such a device, the functions of which are above described, as will comprise a pair of coördinated transparent measuring receptacles with correlated control valves, all of which are assembled in a simplified form and convenient to operate by the fuel oil dispenser.

With the above and other objects in view the invention has relation to a certain design in its combination and assembly of parts and its co-joined relation with fuel dispensing devices, an example of which is given in the following specification, particularly pointed out in the appended claim and illustrated in the accompanying views of the drawing, wherein;

Figure 1 illustrates a view in front elevation of the sight feed measuring device.

Fig. 2 illustrates in front elevation the measuring device attached to one form of a fuel oil or gasolene dispensing device.

Referring more in particular to the views of the drawing, wherein the same parts throughout are designated by the same reference characters, the numeral 1 indicates the body or fuel oil container base of one form of modern gasolene dispensing device or pump. The usual form of cover head or casing 2 supported upon a vertical standard 3 rising from the base 1 is provided and adapted to be lowered and locked upon the base 1 thereby inclosing the several operative parts of the dispensing pump and locking same from use by the public.

The preferable use of this visible liquid measuring device will contemplate its connection with the dispensing pump or device in such a manner as will admit of the usual covering casing 2 to be lowered or closed about the visible measuring device thereby securely housing same.

A pair of measuring receptacles or cylinders 4 and 5 are provided and arranged vertically parallel one with the other, said measuring cylinders being provided with a base member 6 and cap member 7, which securely space said cylinders apart and in an upright position. The bases 6 and 7 for the measuring receptacles also close the cylinders forming liquid tight receptacles. The measuring receptacles will preferably be of a size just sufficient to hold one unit of measure of fuel, which unit quantity is generally one gallon, and therefore the measuring cylinders will for all practical purposes and use be of a one gallon capacity. Said measuring receptacles or cylinders will be made of glass so that their contents may be exhibited to the buyer. Any acceptable form and design of construction of the measuring cylinders is permissible under this use, such as metal cylinders provided with gages, or with a glass filled slot which would permit the buyer to watch the height of the fuel in the cylinder. Connecting tubes 8 and 9 have open connection with the interior of the cylinders 4 and 5 and have connection with a three-way valve 10, which valve is provided with a handle 11, which exercises a turning control over the valve core 12. A tube 13 connects with the three-way valve 10 and extends downwardly into the measuring pump of the regular fuel dispenser of present day use, connecting with the outlet of the pump in such a manner as to transmit the gasolene from the pump to the valve 10 there to be directed to either measuring cylinder as later seen.

Tubes or pipes 14 and 15 have interior connection with each measuring cylinder through the base 6 and have a common connection with a T member 16 which T member is provided with screw threads and adapted to receive the flexible tubing which is used in conveying the fuel oil or gasolene from the measuring device to the tank of the car to be filled. A cut-off valve 17 is provided in each tube 14 and 15 between the member 16 and cylinders. Each of said cut-off valves is provided with a lever 18 fixed to the core of its respective valve. A link 19 has pivotal connection with each lever 18 and is provided with an upturned handle 20. Through the agency of the member 20 it is possible to operate the two valves at one manipulation of the handle, thereby exercising a certain later described closing and opening control over each of the tubes 14 and 15. The two valves 17, one of which is disposed in each tube 14 and 15 are so timed in relation one to the other that when one valve is open the other is closed. Such a relation as described, that is one valve 17 being closed when the other is open, is secured by arranging the levers 18 in fixed connection with the cores of said valves in such a manner as to have the open passage of the valve core disposed horizontally, which closes said valve, while the other valve has its core passage vertically disposed, which means that the last named valve will be open. This arrangement will permit the fuel to flow from one cylinder while it is being held in the other. The cylinder to be drained will depend upon whether the handle 20 is in an upright position as illustrated, or is downwardly displaced as illustrated in dotted lines. The flexible hose connection between the filling device and the purchaser's car is shown designated by the numeral 21 in Fig. 2.

In the use and operation of this sight feed measuring fuel dispensary the open nozzle end of the flexible hose will be placed in the tank of the automobile and the pump of the fuel dispensing device used in the usual way. A hand crank is commonly provided on the gasolene dispensing devices of modern day use for operating the measuring pump and in the use of this device such arrangement is not altered or changed in any way. The valve handle 11 of the three-way valve 10 will normally be up, which will pass the fuel into the measuring cylinder 4. Since the passage through the core 12, as is illustrated in dotted lines, will thus direct the fuel as seen in Fig. 1, when the operator has pumped one gallon into the receptacle 4 he will immediately displace the three-way valve handle 11 downwardly thereby changing the course of the flowing oil into the cylinder 5. During the pumping operation necessary to fill the first receptacle the valve 17 having connection therewith through the tube 14 is closed. Simultaneously with the downward displacement of the valve handle 11 the operator will pull the handle 20 into a position indicated by the dotted lines, which immediately brings the valves into a new relation one with the other. This later position of the valves opens the tube 14 and closes the tube 15, thereby permitting the fuel to drain from the receptacle 4 into the tube 21 and storage tank of the motor vehicle. At the same time that the fuel is draining from the receptacle 4 into the automobile the receptacle 5 is closed through the valve 17 and open through the valve 10. This operation as described is carried on intermittently, filling first one measuring receptacle and then the other until the desired number of gallons are drawn.

The use of this invention to consumers of gasolene insures the public in general against the inaccuracy of measurements of fuel oil dispensed from the modern gasolene dispensaries.

The invention is presented to include any form or design of sight feed measuring device which may be contemplated to be used in connection with the present day gasolene dispenser, and which device might come within the purview of the following claim.

Claim:

In a sight feed gasolene dispensing pump, the combination with a cabinet comprising a base and a cover top, of a pair of transparent cylindrical containers arranged within the cabinet so they may be covered up by the cover top, said cylinders connected at the top by a pipe, and at the bottom by a pipe, a three way valve arranged in the upper pipe connection, a feed pipe connecting with the three way valve, a cut off valve connected with the lower extremity of each cylinder and included in the pipe which connects the lower ends of the cylinders, and a linked connection comprising a rod pivotally connected with each cut off valve and provided with a handle for operating the valves in such a way that when one is closed the other is open.

In testimony whereof I hereunto affix my hand this the 6th day of Dec. A. D. 1916.

GRAYDON M. TERRY.

Witnesses:
 OLIN A. TERRY,
 W. L. MOORE.

Copies of this patent may be obtained for five cents each, by addressing the "Commissioner of Patents, Washington, D. C."